(12) United States Patent
Weaver

(10) Patent No.: US 7,677,499 B2
(45) Date of Patent: Mar. 16, 2010

(54) AIRCRAFT WING COUPLING ARRANGEMENT

(75) Inventor: Clive Weaver, Watford (GB)

(73) Assignee: Ultra Electronics Limited, Greenford, Middlesex (GB)

( * ) Notice: Subject to any disclaimer, the term of this patent is extended or adjusted under 35 U.S.C. 154(b) by 121 days.

(21) Appl. No.: 11/716,752

(22) Filed: Mar. 12, 2007

(65) Prior Publication Data

US 2008/0078879 A1    Apr. 3, 2008

Related U.S. Application Data

(63) Continuation of application No. PCT/GB2005/003532, filed on Sep. 12, 2005.

(30) Foreign Application Priority Data

Sep. 10, 2004   (GB) ................................ 0420185.1

(51) Int. Cl.
*B64C 1/06* (2006.01)
(52) U.S. Cl. .................... 244/131; 244/214; 174/69; 242/615
(58) Field of Classification Search ............... 244/76 A, 244/131, 134, 214, 199, 215, 123, 216, 207, 244/198, 130, 46, 42, 45; 242/388.9; 191/12 R, 191/12.4; 901/42, 43, 44
See application file for complete search history.

(56) References Cited

U.S. PATENT DOCUMENTS

| | | | | |
|---|---|---|---|---|
| 2,129,898 A | * | 9/1938 | Wright | 60/594 |
| 2,191,973 A | * | 2/1940 | Sommer | 242/388.9 |
| 2,214,759 A | * | 9/1940 | Bosch, Jr. | 242/388.9 |
| 3,284,036 A | | 11/1966 | Nansel | |
| 3,551,612 A | * | 12/1970 | Guentner | 191/12 C |
| 3,792,189 A | * | 2/1974 | Stengel et al. | 174/69 |
| 3,949,957 A | * | 4/1976 | Portier | 244/210 |
| 4,255,076 A | * | 3/1981 | Svenning | 414/729 |
| 4,259,066 A | * | 3/1981 | Pietschmann | 433/78 |
| 4,615,499 A | * | 10/1986 | Knowler | 244/134 B |
| 5,094,412 A | * | 3/1992 | Narramore | 244/214 |
| 5,149,017 A | | 9/1992 | McEntire et al. | |
| 5,279,136 A | * | 1/1994 | Perry | 70/18 |
| 5,314,083 A | * | 5/1994 | Wiggershaus et al. | 212/319 |

(Continued)

FOREIGN PATENT DOCUMENTS

DE          2 221 302          11/1973

(Continued)

*Primary Examiner*—Michael R Mansen
*Assistant Examiner*—Justin Benedik
(74) *Attorney, Agent, or Firm*—Dickstein Shapiro LLP

(57) ABSTRACT

An aircraft wing coupling arrangement couples services to and/or from a wing component which is translationally extendible from the wing of an aircraft. A housing is provided for mounting on the wing and includes a first coupling member. A hollow telescopic assembly extends from the housing for connection at a distal end to the wing component and has a second coupling member at the distal end. The telescopic assembly is extendible between a retracted and an extended position. A service carrying conduit arrangement carries the services to and/or from the wing component and extends through the hollow telescopic assembly from the second coupling member to the first coupling member. The service carrying conduit arrangement is flexible to locate excess thereof in the housing when the hollow telescopic assembly is in the retracted position.

22 Claims, 12 Drawing Sheets

U.S. PATENT DOCUMENTS

| | | | | |
|---|---|---|---|---|
| 5,407,153 A * | 4/1995 | Kirk et al. | | 244/199.4 |
| 5,556,059 A | 9/1996 | Maeda et al. | | |
| 6,394,396 B2 * | 5/2002 | Gleine et al. | | 244/198 |
| 6,494,523 B2 * | 12/2002 | Kobayashi | | 296/155 |
| 6,515,229 B2 * | 2/2003 | Aoki et al. | | 174/72 A |
| 6,530,742 B2 * | 3/2003 | Trinler et al. | | 414/718 |
| 6,561,368 B1 * | 5/2003 | Sturm et al. | | 212/319 |
| 6,840,127 B2 * | 1/2005 | Moran | | 74/490.04 |
| 6,969,806 B2 * | 11/2005 | Dupriest | | 174/117 F |
| 2001/0038058 A1 * | 11/2001 | Gleine et al. | | 244/198 |
| 2004/0173605 A1 * | 9/2004 | Feher et al. | | 219/687 |
| 2006/0038088 A1 * | 2/2006 | Dodson | | 244/214 |

FOREIGN PATENT DOCUMENTS

| | | |
|---|---|---|
| DE | 42 21 976 A1 | 1/1994 |
| EP | 0 680 878 A1 | 11/1995 |
| GB | 12444927 | 9/1971 |

\* cited by examiner

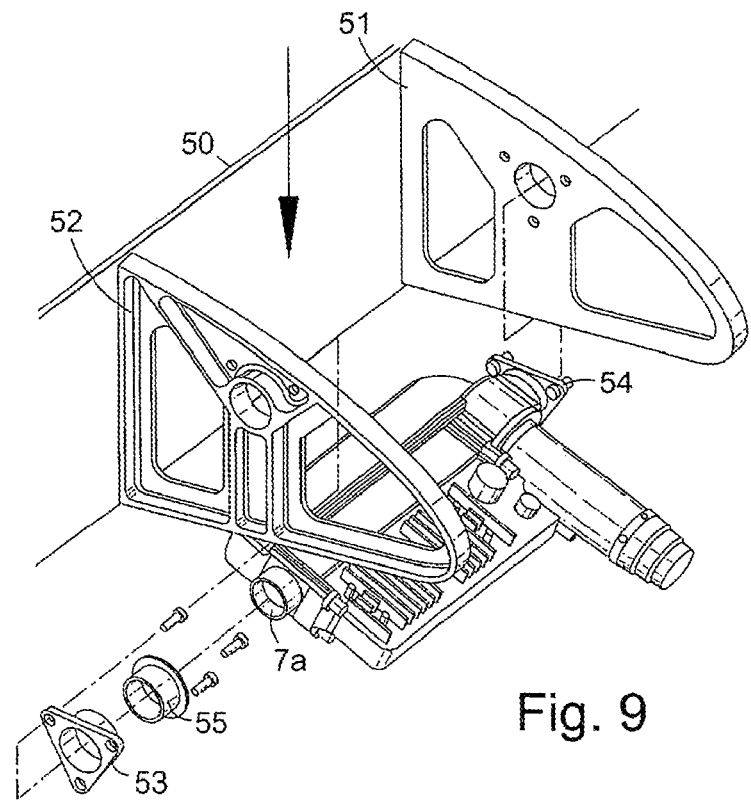
Fig. 9
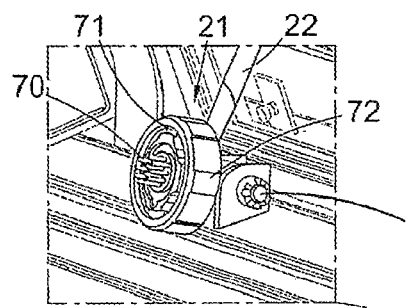
Fig. 10
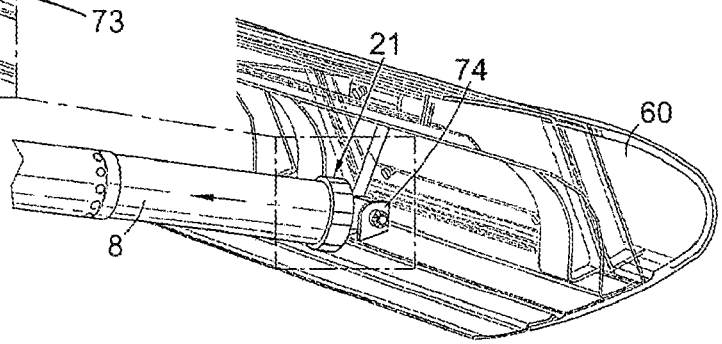

US 7,677,499 B2

AIRCRAFT WING COUPLING ARRANGEMENT

CROSS-REFERENCE TO RELATED APPLICATION

This application is a continuation of a co-pending international application PCT/GB 2005/003532, with an international filing date of Sep. 12, 2005, entitled, "AN AIRCRAFT WING COUPLING ARRANGEMENT", and international application GB/0420185.1, with a filing date of Sep. 10, 2004, both of which are incorporated by reference herein in its entirety.

TECHNICAL FIELD

The present invention generally relates to an aircraft wing coupling arrangement for coupling services to and/or from a wing component which is translationally extendible from the wing of an aircraft.

BACKGROUND OF THE INVENTION

The operational environment of an aircraft wing is extremely hostile. Wing components are exposed to temperatures of between −65° C. and 85° C. Further, the components are exposed to water and ice and are subject to extreme air loading forces.

The wings of aircraft are provided with wing components which extend from the wing main frame to change the aerodynamic shape of the wing. Flaps extend from the rear of the wing and slats extend from the front of the wing.

Due to the low temperatures experienced by the wings in extreme ambient conditions, ice build-up on the wings is a well-known serious problem. This is particularly so on the leading edge of the wing. Ice protection systems are well-known and one such system uses an exhaust feed from the engines to channel hot air along the wings in order to prevent ice build-up (an anti-ice system) or to remove ice (a de-icing system). It is also known in the art to provide electrical de-icing and anti-icing systems which can comprise heating elements or acoustic elements. For wing components which can be extended away from the wing main body, there is thus a need to provide a robust coupling arrangement for coupling services between the wing main body and the extendible wing components. When the wing components are extended, the coupling arrangements are exposed to extreme ambient conditions. In an ice protection system the coupling arrangement is required to provide electrical communication between the ice protection elements provided on the wing components and a ice protection control system provided on the aircraft. There is also a need to provide for lightning strike protection to extendible wing components. This requires electrical cable coupling between wing components and the wing main body.

It is thus an object of the present invention to provide an improved wing aircraft coupling arrangement for coupling services to and/or from a wing component which is translationally extendible from the wing of an aircraft.

SUMMARY OF THE INVENTION

Embodiments of the present invention provide an apparatus that relates to an aircraft wing coupling arrangement for coupling services to and/or from a wing component which is translationally extendible from the wing of an aircraft.

Briefly described, in architecture, one embodiment of the apparatus, among others, can be implemented as follows. An aircraft wing coupling arrangement couples services to and/or from a wing component which is translationally extendible from the wing of an aircraft. A housing is provided for mounting on the wing and includes a first coupling member. A hollow telescopic assembly extends from the housing for connection at a distal end to the wing component and has a second coupling member at the distal end. The telescopic assembly is extendible between a retracted and an extended position. A service carrying conduit arrangement carries the services to and/or from the wing component and extends through the hollow telescopic assembly from the second coupling member to the first coupling member. The service carrying conduit arrangement is flexible to locate excess thereof in the housing when the hollow telescopic assembly is in the retracted position.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 9 is a diagram showing how the aircraft wing coupling arrangement is attached to the wing main body;

FIG. 10 is a diagram illustrating how the aircraft wing coupling arrangement is coupled to and decoupled from the slat;

DETAILED DESCRIPTION OF THE PREFERRED EMBODIMENT

Figure 1:
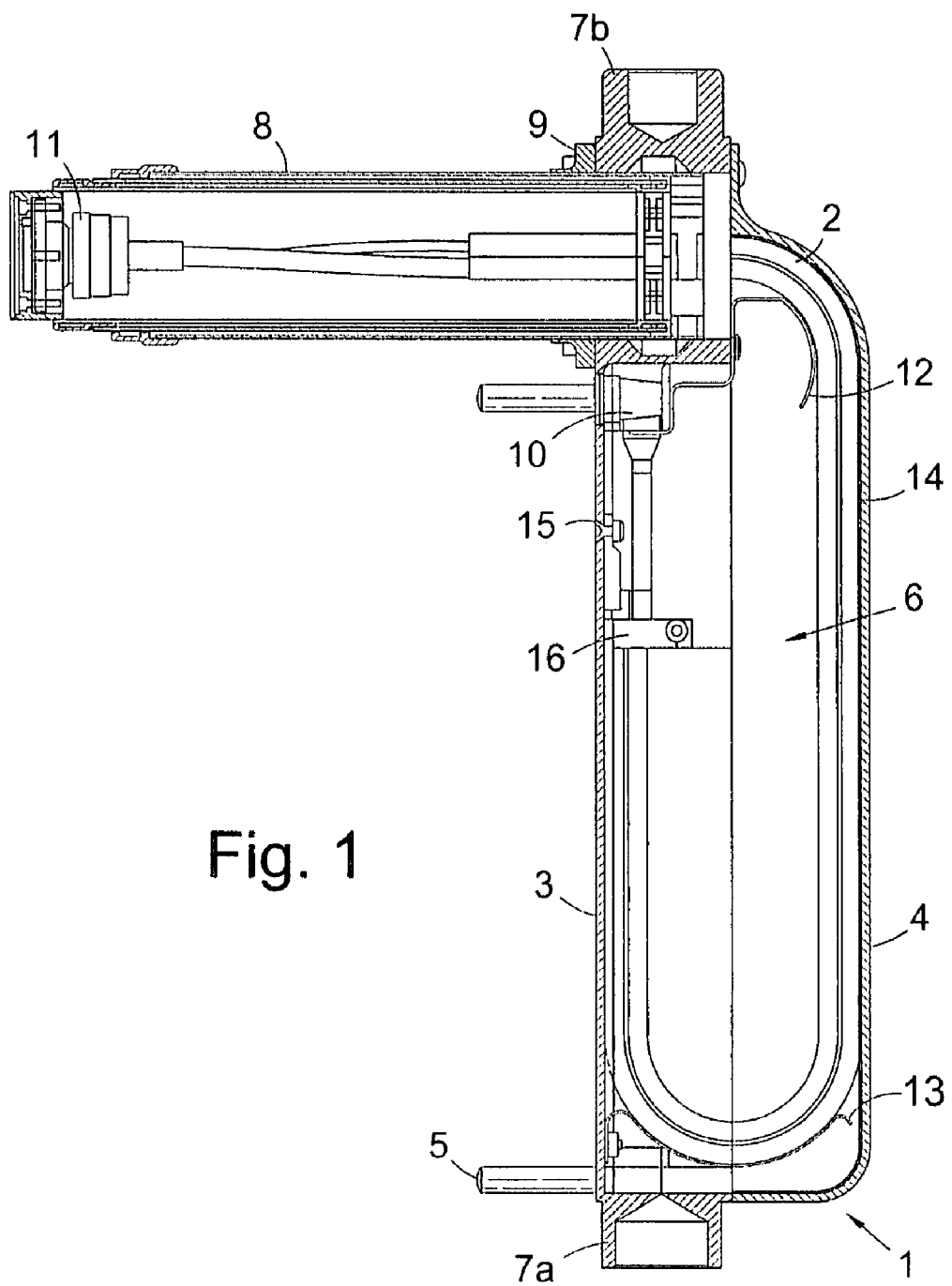
FIG. 1 is a cross-sectional diagram of an aircraft wing coupling arrangement in accordance with an embodiment of the present invention showing a telescopic assembly in a retracted position and coupled to a housing.

The present invention thus provides an aircraft wing coupling arrangement for coupling services to and/or from a wing component which is translationally extendible from the wing of an aircraft. A housing is provided for mounting on the wing and the housing includes a first coupling member. A hollow telescopic assembly extends from the housing for connection at a distal end to the wing component. The hollow telescopic assembly has a second coupling member at its distal end and is extendible between a retracted and an extended position. A service carrying conduit arrangement carries services to and/or from the wing component and extends through the hollow telescopic assembly from the second coupling member to the first coupling member. The carrying conduit arrangement is flexible to locate excess of the service carrying conduit arrangement in the housing when the hollow telescopic assembly is in the retracted position.

Thus the present invention provides a robust coupling arrangement to facilitate the provision of services between a wing main body and a wing component which can be extended away from the wing main body. The service carrying conduit arrangement is protected within the hollow telescopic assembly and when the telescopic assembly is retracted, excess of the service carrying conduit arrangement is stored in the housing.

In one embodiment the housing extends in the direction substantially perpendicular to the direction of extension of the hollow telescopic assembly. This embodiment facilitates the easy accommodation of the housing within the region of an aircraft wing in front of the fixed wing spar between the front fixed wing ribs.

In one embodiment the service carrying conduit arrangement is adapted to flex in only one plane. Thus excess of the service carrying conduit arrangement when the telescopic assembly is retracted is translationally located in the housing. The restriction of the flexion of the service carrying conduit arrangement reduces the flexion of the service carrying conduit arrangement and thus reduces fatigue.

In one embodiment the service carrying conduit arrangement is adapted to be connected to the first coupling member to form a U-shaped region which moves along the housing when the hollow telescopic member is moved between the extended retracted positions. The provision of the U-shaped region in this embodiment of the present invention provides a compact storage of the service carrying conduit arrangement within the housing.

In one embodiment the service carrying conduit arrangement is adapted to flex in only one direction in the plane. Thus the service carrying conduit arrangement can only bend to the right or to the left. Thus reduces the possibility of the service carrying conduit arrangement flexing in an undesirable manner thus reducing the likelihood of fatigue.

In one embodiment the service carrying conduit arrangement is adapted to flex through a right angle in the housing which is arranged perpendicularly to the telescopic assembly and to lie against inner walls of the housing. Support members are provided at the region of the right angle and at regions where the service carrying conduit arrangement is U-shaped to maintain the service carrying conduit arrangement against the inner walls at least when the hollow telescopic assembly is in the retracted position. Thus in this embodiment the storage of the service carrying conduit arrangement in the housing reduces the movement of the service carrying conduit arrangement which can take place during operation of the aircraft, e.g. due to vibrations and thus this reduces likely fatigue.

In order to facilitate smooth movement of the service carrying conduit arrangement in the housing, in one embodiment a material having a low frictional coefficient is applied to the inner walls. In another embodiment to reduce the amount of movement of the service carrying conduit arrangement, resilient material is arranged in the housing between the housing and the service carrying conduit arrangement so as to dampen movement of the service carrying conduit arrangement. In one such arrangement the resilient material is preferably arranged in two layers parallel to the plane either side of the service carrying conduit arrangement. Also in this arrangement preferably a material having a low frictional coefficient supplied to the two layers.

In one embodiment guides are provided in the telescopic assembly and the service carrying conduit arrangement extends through the guides so as to be guided and supported in the telescopic assembly. This reduces the amount of lateral movement possible thus reducing likely fatigue.

In one embodiment the hollow telescopic assembly is provided with a wing component coupling arrangement for coupling a distal end of the telescopic assembly to the wing component. The wing component coupling arrangement includes a wing component coupling member for coupling with the second coupling member of the telescopic assembly. The provision of a separate wing component coupling arrangement enables the provision in one embodiment of the ability of the wing component coupling arrangement to break at a predetermined load to separate the hollow telescopic arrangement and the wing component. The feature of this embodiment is desirable since wing components can separate from the main wing member during operation and it is undesirable for the wing component to remain attached to the wing main body by the aircraft wing coupling arrangement in such operating circumstances. Further, the provision of the wing component coupling arrangement allows for the facility to decouple the telescopic assembly and the wing component during maintenance. This allows for ease of fitment of the aircraft wing coupling arrangement. In one embodiment the housing includes a pivot arrangement for allowing the pivotal mounting of the aircraft wing coupling arrangement on the wing. This embodiment takes into consideration the fact that for some wing components the movement is not linear and is instead in an arc. The pivoting of the aircraft wing coupling arrangement on the wing allows for this arcuate motion to be tracked.

In one embodiment a local controller is coupled to or provided in the housing and provides for local control of the services to and/or from the wing component. In an embodiment applied to ice protection on the wing component, the local controller can control the application of electrical power through the aircraft wing coupling arrangement.

In one embodiment the hollow telescopic assembly comprises a plurality of coupled concentric tubes. Each concentric tube which is coupled to another concentric tube is a bearing housing member housing a bearing arrangement to allow two coupled concentric tubes to move relatively translationally. The bearing housing members define a radial gap between the two coupled concentric tubes. At least one radial hole is provided in an outer concentric tube and/or the bearing housing member for communicating ambient conditions to the gap. The bearing housing member of a radially inner of the two coupled concentric tubes has a shoulder shaped to close the gap when the hollow telescopic assembly is in the extended position. The embodiment of the present invention allows for differential expansion between the concentric tubes and avoids the problem of ice build-up.

The present invention is applicable to the provision of any service between a wing main member and a wing component which is extendible from the wing main member. Such services can be the provision of electrical power to the wing component, e.g. in an ice protection system. The services can also include the transmission of signals to and from the wing component. For example, in an ice protection system thermo couple detection signals are transmitted back through signalling wires from the wing component. The present invention does not however limit it to the provisions of electrical power and signals between the wing main member and wing component. For example, the service carrying conduit arrangement can carry hydraulic or pneumatic services.

Figure 2:
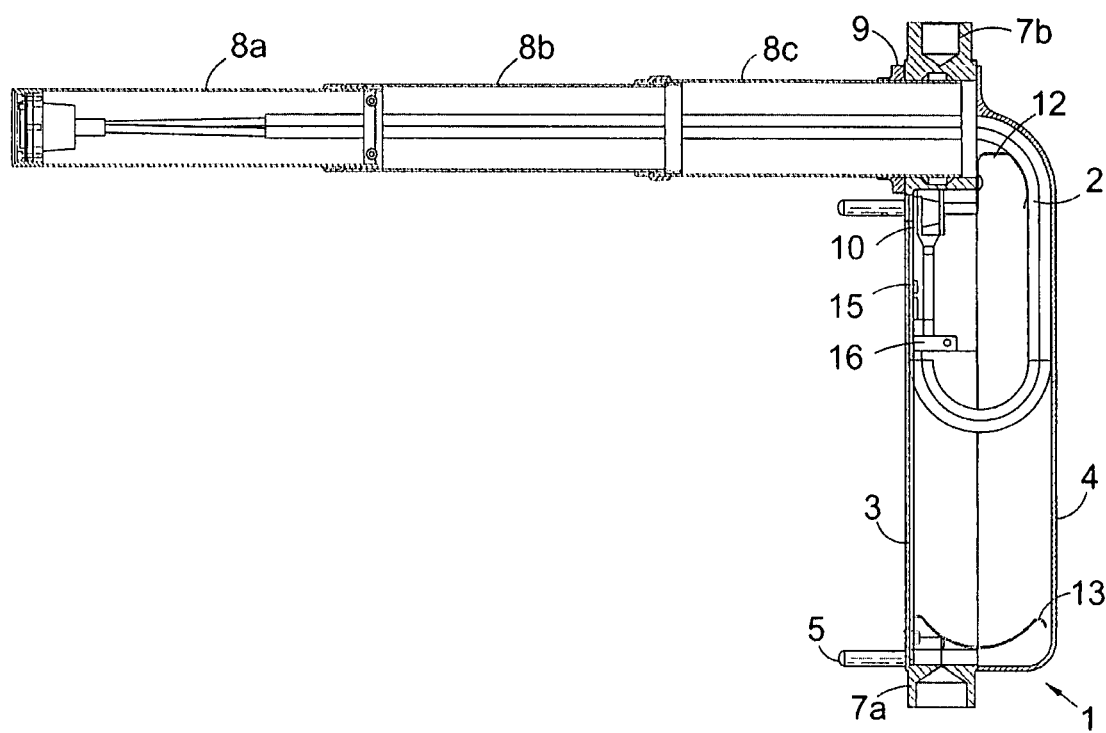
FIG. 2 is a cross-sectional diagram of the embodiment of the present invention showing the telescopic assembly in the extended position.

Referring now to the diagrams, FIGS. 1 and 2 illustrate an embodiment of the present invention applied to a wing ice protection system. Thus in this embodiment the services to be coupled between the wing main body and the wing component, which in this case comprises a slat at the leaning edge of the wing, comprises electrical power and electrical signals. Thus in this embodiment the service carrying conduit arrangement comprises electrical cables.

As can be seen in FIGS. 1 and 2, a cable housing 1 is provided for housing a cable assembly 2. The cable housing 1 comprises a housing main body 3 and a housing cover 4. The housing cover 4 is detachable from the housing main body 3 as will be seen in more detail hereinafter. The housing main body 3 has four mounting studs 5 for the mounting of a local controller (not shown) as will be described in more detail hereinafter. The housing main body 3 and the housing cover 4 extend to form a cable receiving area 6 for receiving the cable assembly 2. The cable housing 1 is elongate to house an elongate looped length of the cable assembly 2. At either end of the housing main body 3 trunnion pins 7a and 7b are provided for pivotal coupling to the wing main body as will be described in more detail hereinafter. A telescopic assembly 8 comprises three concentric tubes 8a, 8b, 8c move relatively translationally and concentrically in a telescopic manner. An outer telescopic tube 8c is coupled to one end of the housing main body 3 and held in place by a flange 9. The telescopic tube 8b fits concentrically within the telescopic tube 8c slides translationally concentrically therein. The telescopic tube 8a fits within and slides translationally and concentrically within the telescopic tube 8b. The cable assembly 2 generally extends within the telescopic assembly 8 between a first coupling member which is a floating connector 10 arrangement in the cable housing 1 and a second coupling member 11 arranged at a distal end of the telescopic assembly 8. The floating connector 10 is arranged to be fixedly connected to connector within a local controller (not shown) which is fitted to the mounting studs 5 of the housing main body 3. In this way the floating connector 10 is fixed to the local controller. The second coupling member 11 provides coupling to the slat via a wing component coupler (not shown) which will be described in more detail hereinafter. Thus the cable assembly 2 is fixed at each end. When the telescopic assembly 8 is in the retracted position, as illustrated in FIG. 1, excess cable assembly is housed in the cable housing 1. When the telescopic assembly 8 is in the extended position as illustrated in FIG. 2, a length of the cable assembly 2 is pulled out of the cable housing 1 into the telescopic assembly 8.

The cable assembly comprises two flat cable members carrying electrical cables. The structure of the cable assembly will be described in more detail hereinafter.

Within the cable housing 1 a cable entry guide 12 is provided as a resilient spring member to guide the cable of the cable assembly 2 into the cable housing against an inner wall of the housing cover 4. Thus at this point the cable assembly 2 flexes through a right angle. The cable entry guide 12 keeps the cable against the wall of the housing cover 4. At the other end of the cable housing 1 the cable assembly undergoes a U-turn to lie against the inner wall of the housing main body 3. At the position of the U-turn a cable support member 13 formed of a resilient spring material is provided. Thus in this way the cable entry guide 12 and the cable support member 13 resiliently urge the cable assembly 2 against the walls of the cable housing 1 and reduce the free movement of vibration experienced by the cable assembly 2, thereby reducing cable fatigue. The inner wall of the housing cover 4 is provided with a compliant wear pad 14 which comprises compliant material covered in a low frictional coefficient material such as PTFE. The compliant wear pad 14 thus acts to cushion the cable assembly 2 and reduces friction as the cable and the cable assembly 2 slides along. To reduce friction between the cable and the cable assembly 2 and cable entry guide 12, the cable entry guide 12 is also coated with a low frictional coefficient material such as PTFE.

Within the housing main body 3 the cable assembly 2 terminates not only at the floating connector 10 but also at a lightning strike bonding point 15 as will be described in more detail hereinafter, the cable assembly carries cables not just for the provision of power and signal between the local controller and heater mats provided on the slats, but also lightning strike conduction.

Within the housing main body 3, a cable strain relief connection 16 secures the cable assembly 2 to the housing main body 3.

Figure 3A:
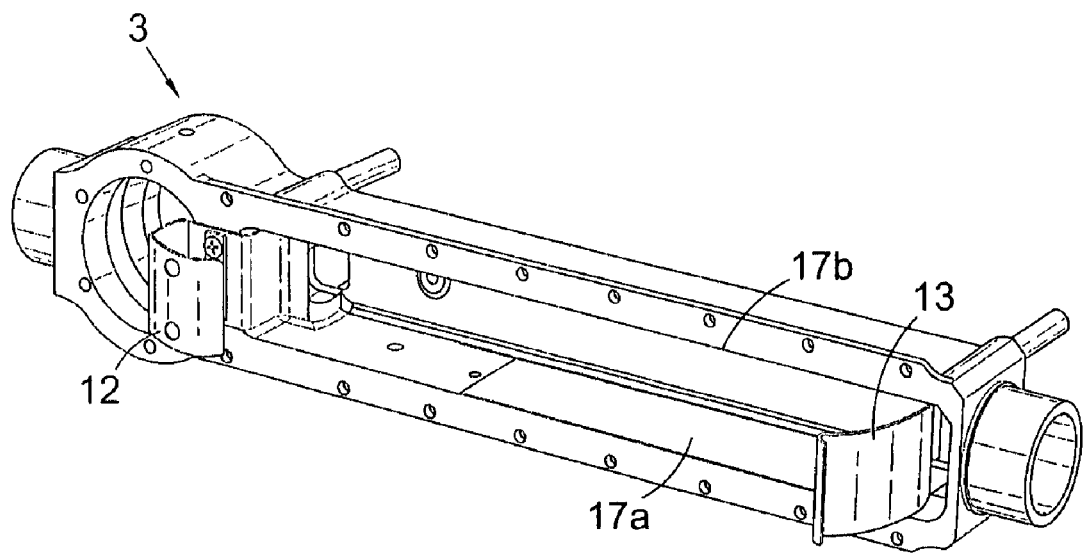
FIGS. 3A and 3B are diagrams illustrating the structure of the main body of the cable housing of the embodiment of FIGS. 1 and 2.
Figure 3B:
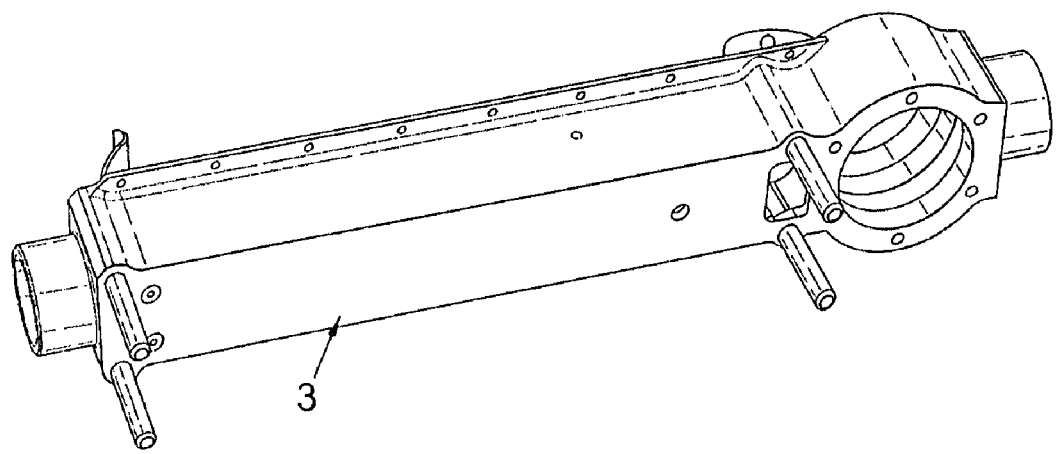

FIGS. 3A and 3B show the structure of the housing main body 3 in more detail. As can be seen in FIG. 3A, within the housing main body compliant wear pads 17a and 17b are provided on upper and lower surfaces to guide and restrict movement of the cable in a direction perpendicular to the normal translational movement of the cable assembly. Thus the provision of the cable support member 13, the cable entry guide 12, the compliant wear pad 14, and the compliant wear pads 17A and 17B provide an environment in which the cable assembly is supported. This arrangement prevents mechanical overloading of the conductors in the cable. It also allows the cable to be pushed and dragged over the surfaces without the risk of collapsing. The arrangement also provides a mechanism to control cable bend radius thus reducing cable fatigue.

Figure 4:
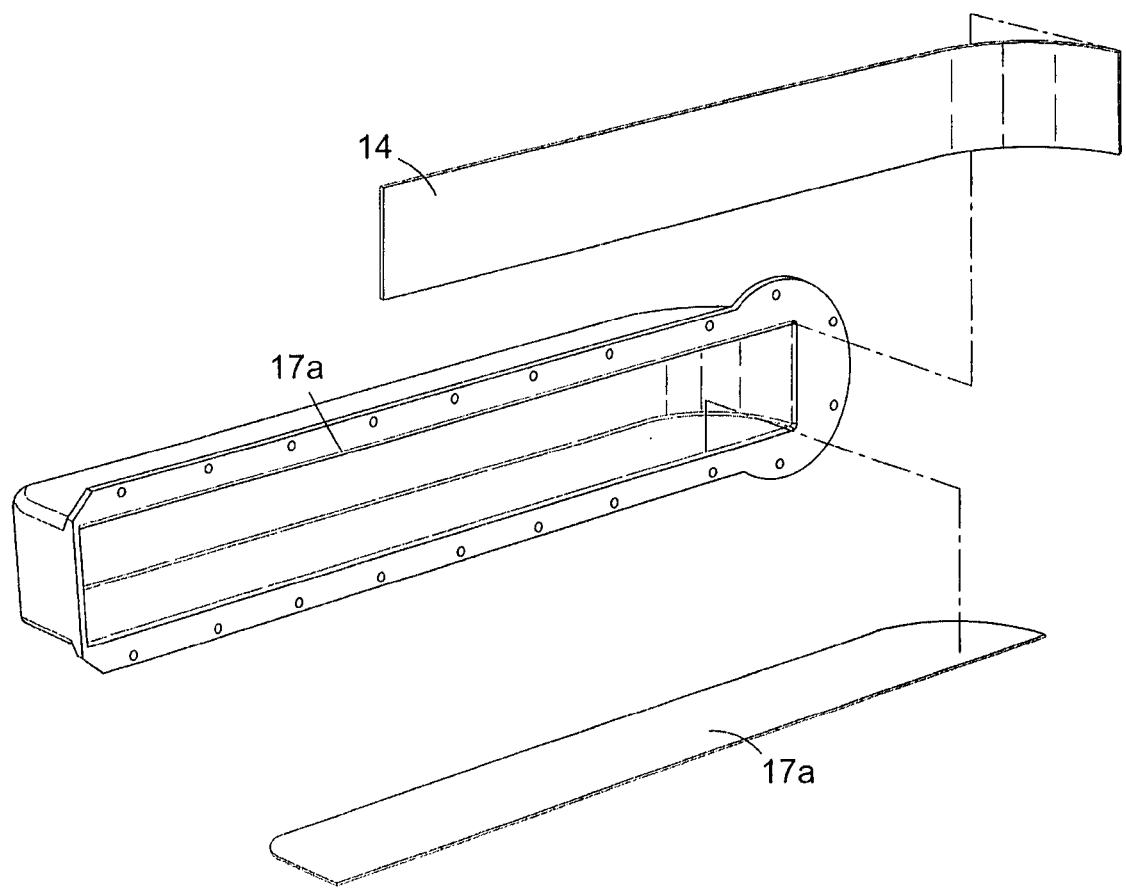
FIG. 4 is a diagram of the housing cover of the embodiment of FIGS. 1 and 2.

FIG. 4 illustrates the housing cover 4 in more detail. As can be seen, the inner surfaces of the housing cover 4 are covered with compliant wear pads 14, 17a and 17b.

Figure 5:
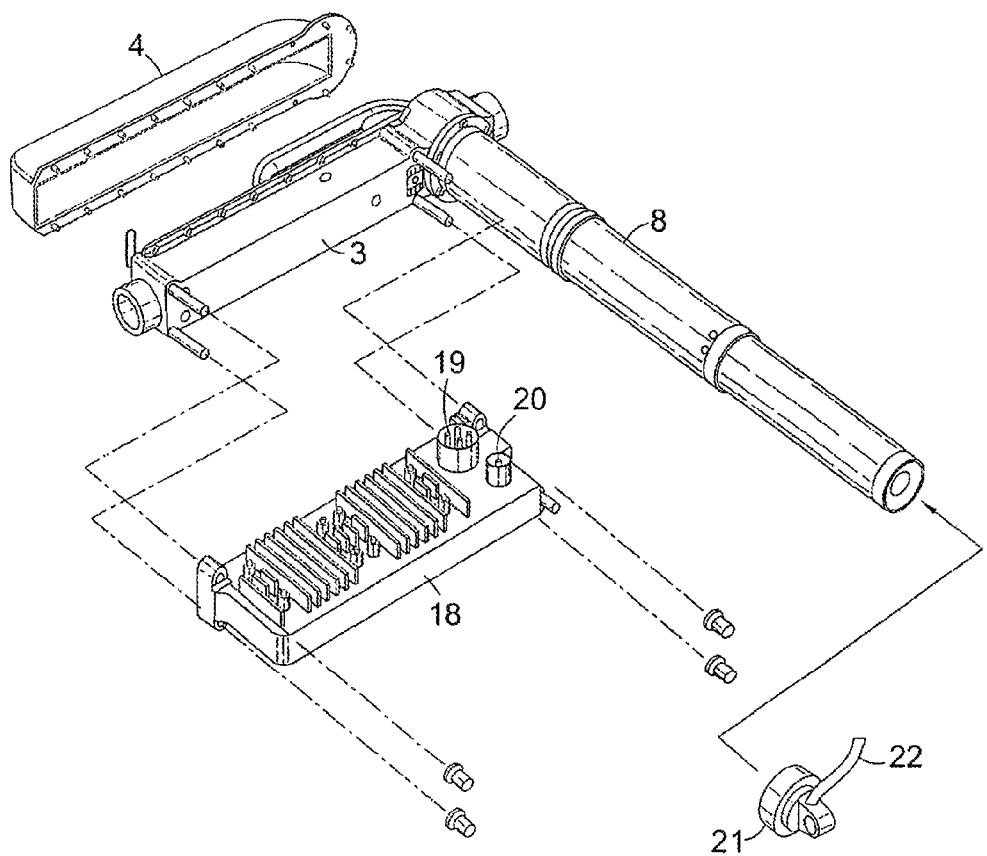
FIG. 5 is an exploded diagram of the components of the embodiment of FIGS. 1 and 2 illustrating the attachment of a local controller to the assembly and the attachment of a wing component coupler.

FIG. 5 illustrates how the local controller 18 is coupled to the housing main body 3. The local controller 18 contains electronics to control the application of high-powered heater power through the cable assembly 2. The heater power is typically applied as a 3-phase 230 VAC, 360-800 Hz 40 kVA supply. This is provided to the local controller through the electrical connector 19. The local controller 18 also receives feedback signals through the cable assembly 2 and these are used to control the application of heater power through the cable assembly 2. The local controller 18 receives control signals through a connector 20 to control the application of heater power through the cable assembly 2.

At a distal end of the telescopic assembly 8 a wing component coupler 21 is provided coupling the distal end of the telescopic assembly 8 to the slat. The wing component coupler 21 comprises a rotational threaded cap to mate with a threaded end portion of the telescopic assembly 8 and a central main body carrying connector pins for connection with connection sockets at the distal end of the telescopic assembly 8. The wing component coupler also comprises a mechanical coupling arrangement for coupling to the slat and an electrical coupling lead 22 for coupling to the heater elements on the slats.

Figure 6:
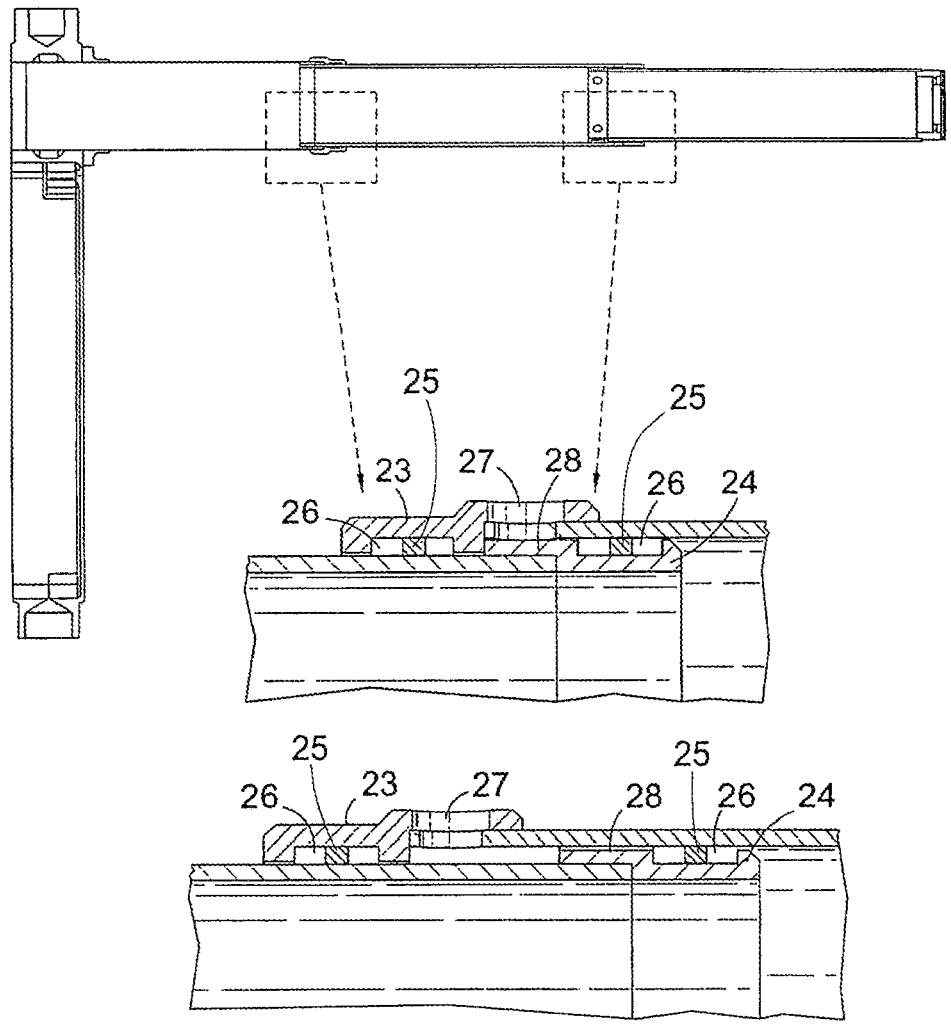
FIG. 6 is a diagram of the embodiment of FIGS. 1 and 2 showing in more detail the construction of the coupling arrangements between the tubes of the telescopic assembly.

FIG. 6 illustrates the coupling of the telescopic tubes 8a, 8b, 8c of the telescopic assembly 8. The ends of the outer telescopic tubes carry outer bearing housing members 23 and the ends of the inner telescopic tubes carry inner bearing housing members 24. The bearing housing members 23 and 24 carry bearing strips 25 which comprise low friction maintenance free material to facilitate the translational motion between the telescopic tubes. The bearing housing members 23 and 24 provide for a gap 26 between the telescopic tubes. Six radial drain holes 27 are provided through the outer bearing housing members 23 and the outer telescopic tubes to provide for communication between the gap 26 and the ambient environment. Thus when the telescopic tubes are in a retracted position, the gap 26 provides for relative differential expansion between them. When the telescopic tubes are in the extended position, a shoulder 28 of the inner bearing housing member 24 is carried by the inner telescopic tube to cover the gap. This arrangement prevents ice build-up.

Figure 7:
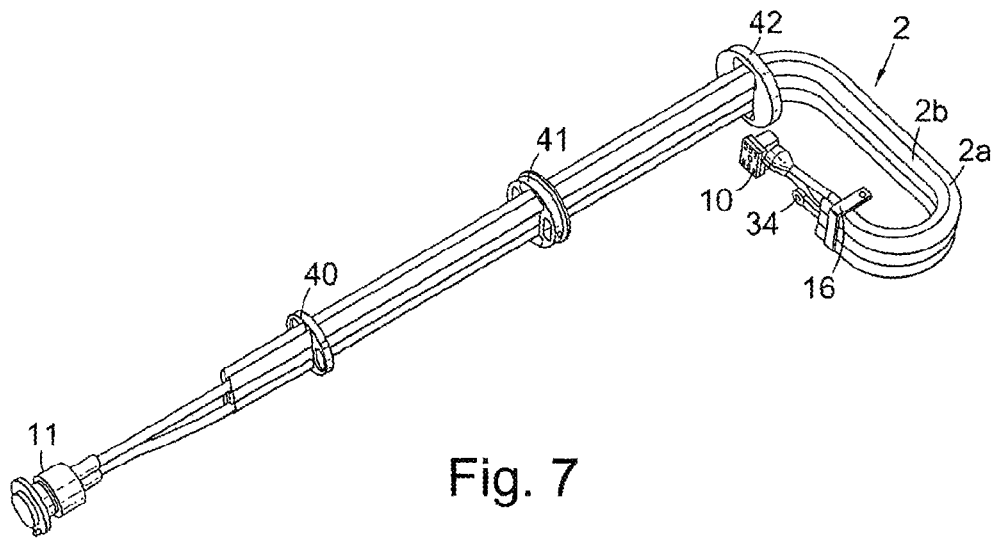
FIG. 7 is a diagram illustrating the structure of the cable assembly of the embodiment of FIGS. 1 and 2.

FIG. 7 is a diagram illustrating the structure of the cable assembly 2 in more detail. The cable assembly 2 comprises two flat cable members 2a and 2b. The structure of the cable members is shown in more detail in the cross-section of FIG. 8. Cable member 2a comprises three pocket regions within a plastic covering 30 upper and lower pockets are filled with cable support material 31 and 32 while the central pocket carries two lightning conductor cables 33. The lightning conductor cables terminate at a connector 34 for coupling to the lightning strike bonding point 15. The second cable member 2b comprises three pockets within a plastic coating 35, a central pocket 36 is filled with a support material. The upper and lower pockets are filled with cables 37a, 37b, 37c and 37d. Cables 37a, 37b and 37c each carry a separate phase of the 3-phase power supply. Cable 37d carries the feedback signals from the thermistors provided with the heater mats on the slat.

Figure 8:
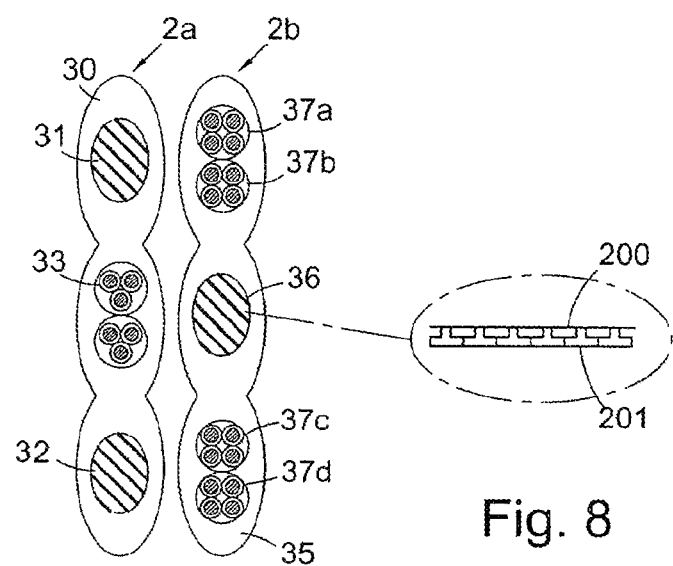
FIG. 8 is a cross-section through the cable assembly of FIG. 7.

The support members 31, 32 and 36 in the cable members 2a and 2b comprise a structure which only allows for the flexing of the cable assembly 2 in one direction in the plane. The cable assembly 2 can only flex in a planar manner due to the flat nature of the cables and also due to the nature of the support members 31, 32 and 36. However, these support members also restrict the flexing of the cables to only one direction within the plane. The structure allowing this is illustrated in FIG. 8. A length of resilient material 200 e.g. steel supports a series of blocks 201 that only allow the structure to bend in one direction as indicated by the arrow. The cable of the cable assembly in this embodiment of the present invention preferably comprises GORE® Trackless Cable available from WL Gore Associates GmbH.

As can be seen in FIG. 7 with reference to FIG. 2, at the end of the inner most telescopic tube 8a a strain relief connection 40 is provided to hold the cable assembly at a central position within the telescopic tube 8a. Since no relative motion is required between the cable assembly and the strain relief connection 40, the strain relief connection can be fixed to the cable assembly 2. The end of the second telescopic tube 8b a first cable guide 41 is provided to hold the cable assembly 2 in a central position in the telescopic tube 8b. Since the cable assembly moves translationally within the telescopic tube 8b, the first cable guide allows for the movement of the cable therethrough. A second cable guide 42 is provided at the end of the third and outer most telescopic tube 8c. The cable assembly is required to move through the second cable guide 42.

FIG. 9 is a diagram illustrating the mounting of the aircraft wing coupling arrangement to the wing main body. As can be seen in FIG. 9, the fixed wing spar 50 extends along the wing and fixed wing ribs 51 and 52 extend perpendicularly towards the front of the wing. The fixed wing ribs 51 and 52 are arranged to carry the wing skin which is not shown. Each fixed wing rib 51 and 52 is provided with holes for the mounting of a trunnion bearing housing 53 and 54. The trunnion pins 7a and 7b of the housing main body 3 fit into a trunnion bearing 55 and the trunnion bearing 55 fits into a respective trunnion bearing housing 53 and 54. The trunnion bearing housing 53 and 54 is then screwed to the fixed wing rib 51 or 52 respectively. Thus in this way the aircraft wing coupling arrangement is pivotally attached to the wing.

FIG. 10 illustrates the coupling of the telescopic assembly 8 to the slat 60 in more detail. The wing component coupler 21 comprises electrical pins 70 connected to a pin holder 71 mounted on a breakable connector plate (not visible). A screw ring 72 is relatively rotational around the pin holder and has an internal screw thread for coupling to an external screw thread on the distal end of the telescopic assembly 8. The wing component coupler 21 has a body with a hole through which a clevis bolt 73 is fitted. On the slat 60 flanges 74 extend so that the clevis bolt 73 can extend through the flanges 74 and the hole in the wing component coupler 21. Thus a pivot point is provided on the slat 60 to allow pivotal connection between the telescopic assembly 8 and the slat 60. If the slat 60 becomes detached from the wing, the screw ring 72 will remain attached to the telescopic assembly and the pin holder will pull away through the screw ring as the connector plate breaks. The pins 70 may shear or may pull away cleanly during the breakaway operation thus in this way the mechanical and electrical coupling between the slat and the wing is broken when necessary. This is typically under a breakaway force of between 900 and 2000 N.

Figure 11:
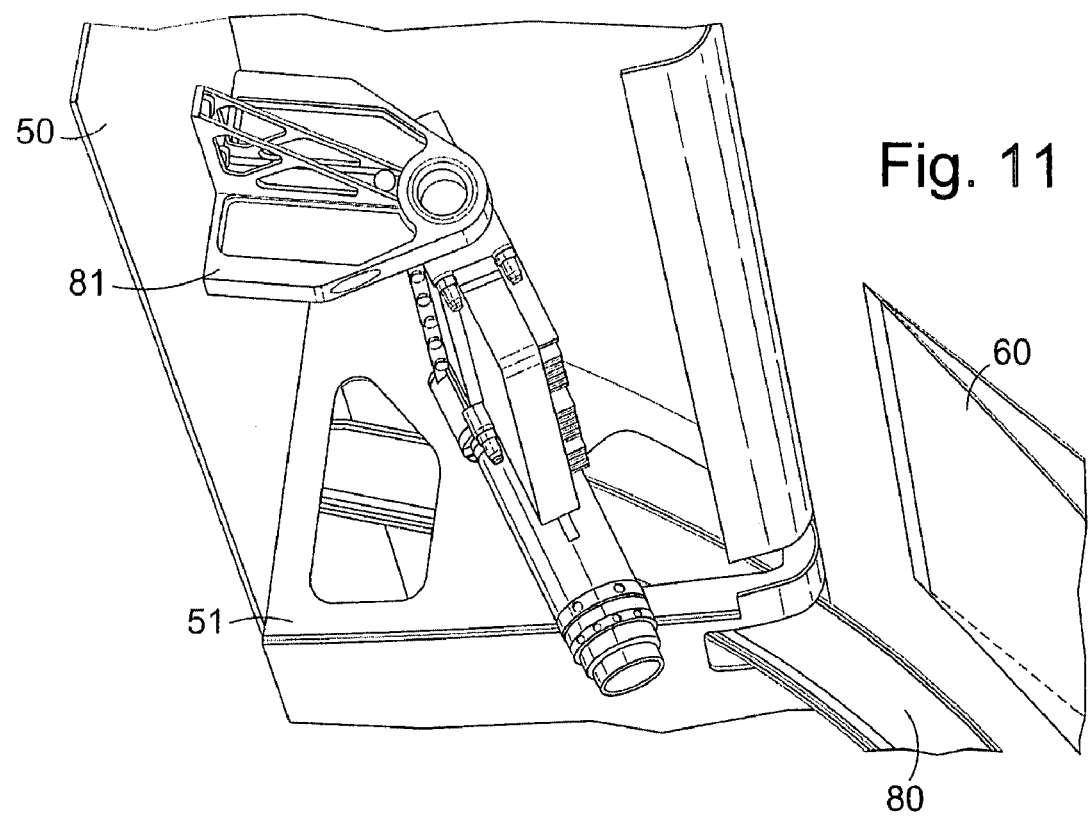
FIG. 11 is a diagram illustrating the aircraft wing coupling arrangement in a decoupled configuration.

FIG. 11 illustrates the aircraft wing coupling arrangement in a de-coupled position. The slat 60 is shown in the deployed position as held by the slat deployment mechanism 80. The telescopic assembly 8 has been retracted in this drawing.

Figure 12:
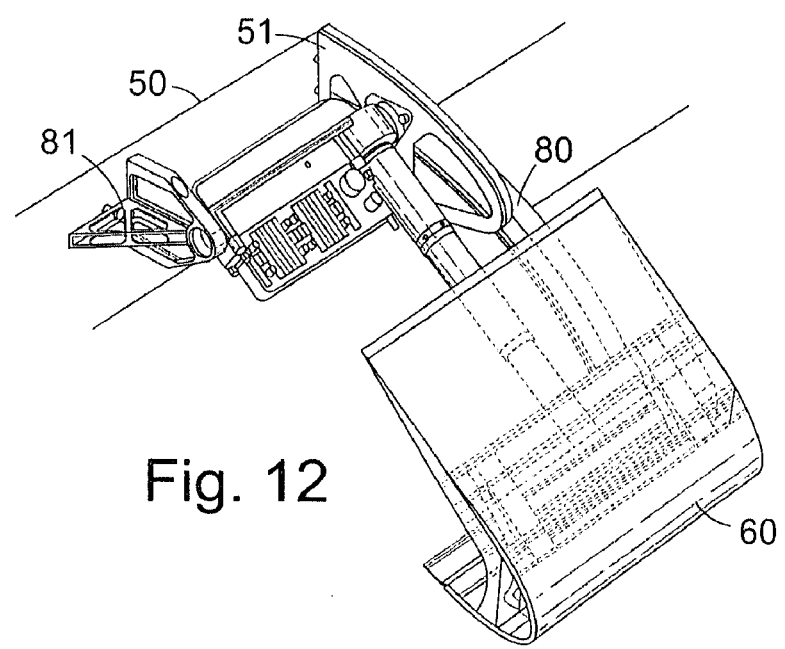
FIG. 12 is a part cut away diagram showing the aircraft wing coupling arrangement in-situ coupling the main wing member and the slat.

FIG. 12 illustrates the aircraft wing coupling arrangement coupling the main wing and the slat. The skin of the wing has been cut away to show the aircraft wing coupling arrangement and only part of the slat 60 is illustrated. The arrangements illustrated in FIGS. 11 and 12 differ from the arrangement illustrated in FIG. 9 in that the aircraft wing coupling arrangement is coupled between a fixed wing rib 51 and a spar bracket 81 which has been affixed to the fixed wing spar 50. This spar bracket 81 is required since there is no convenient second affixed wing rib in this arrangement.

Figure 13:
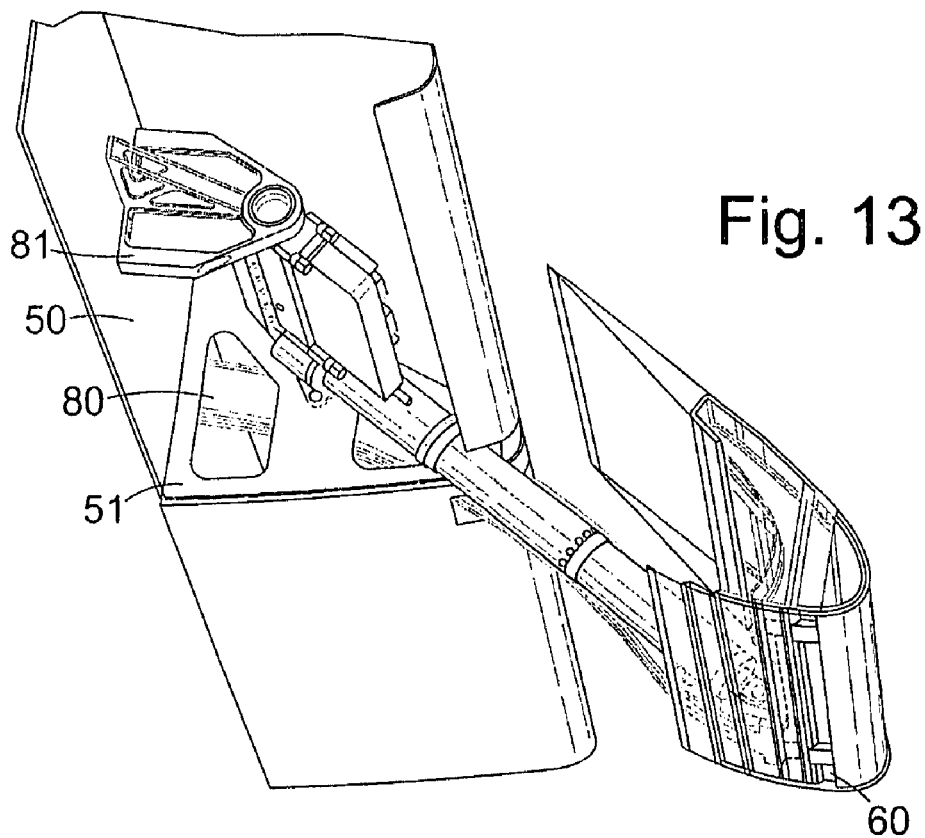
FIG. 13 is a further part cut away diagram showing the aircraft wing coupling arrangement in-situ coupling the wing main body and the slat.

FIG. 13 further illustrates the embodiment of FIG. 12 from an underneath direction showing the arrangement of the upper wing skin through which the telescopic assembly projects.

Figure 14:
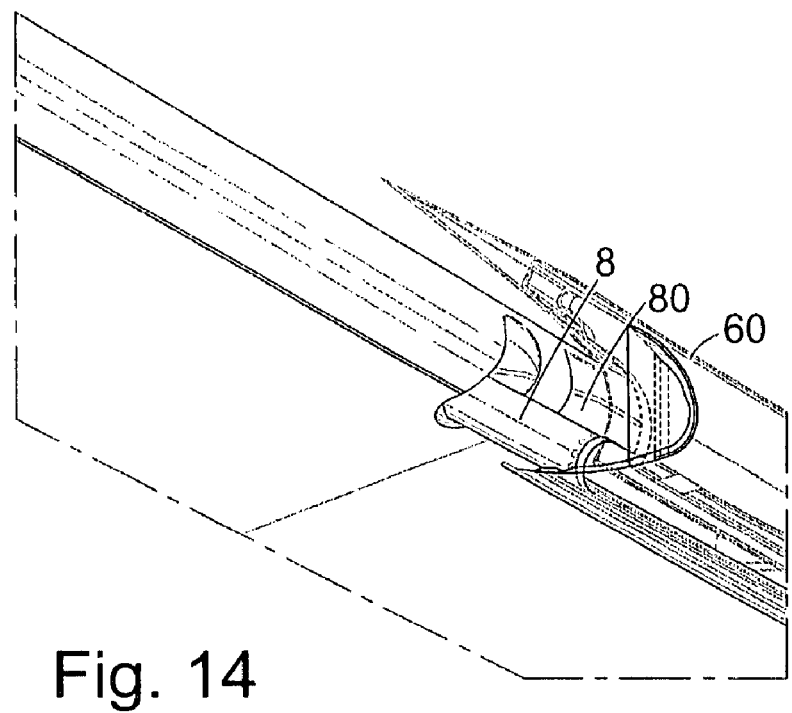
FIG. 14 is a diagram illustrating the aircraft wing coupling arrangement extending through the wing main body and coupled to a slat.

FIG. 14 illustrates the embodiment of FIGS. 11, 12 and 13 with the complete wing skin shown.

Figure 15B:
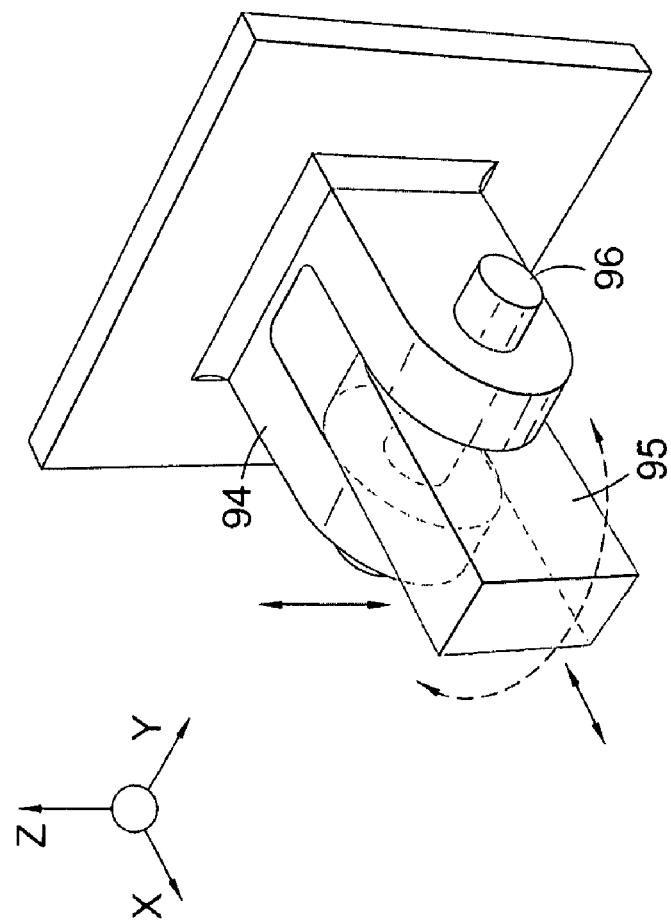
FIGS. 15A and 15B illustrate alternative breakaway mechanisms for attaching the telescopic assembly from the slat under extreme load conditions.
Figure 15A:
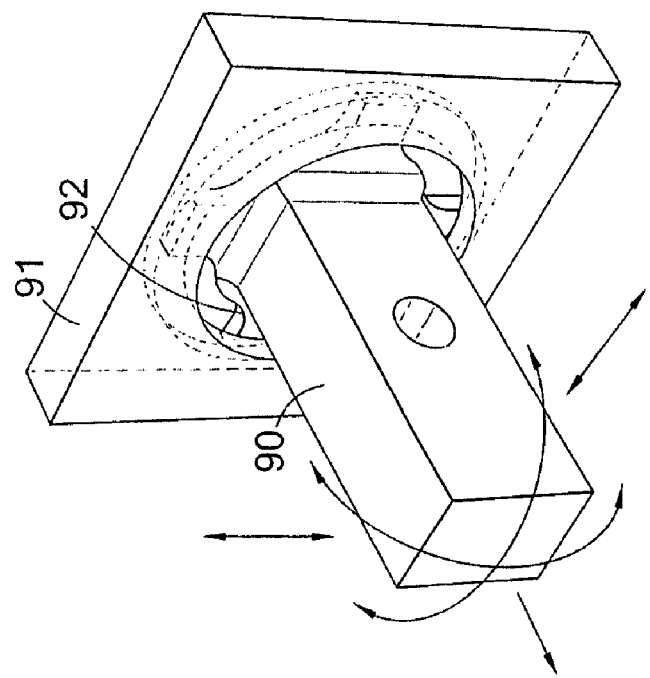

FIGS. 15A and 15B illustrate alternative breakaway mechanisms for allowing the de-coupling of the telescopic assembly 8 and the slat 60. In FIG. 15A a coupling member 90 is held in a mounting plate 91 by four orthogonal breakable coupling members 92. Thus in this way when the telescopic assembly and the slat experience severe forces in any direction, the coupling members 92 can break thereby mechanically releasing the slat from the telescopic assembly 8. A separate electrical coupling release mechanism can take the form of a lanyard cable type release mechanism such a well-known the art.

FIG. 15B illustrates an alternative embodiment in which a yolk arrangement 94 couples to a coupling member 95 via a breakable pivot pin 96.

In alternative embodiments for the provision of the breakaway feature, an arrangement is provided to decouple the telescopic assembly when it is over extended or rotated. Such an arrangement can comprise a lanyard coupling which will react to the over extension or over rotation to remove a coupling device such as a pin from the wing member coupling arrangement.

Figure 16:
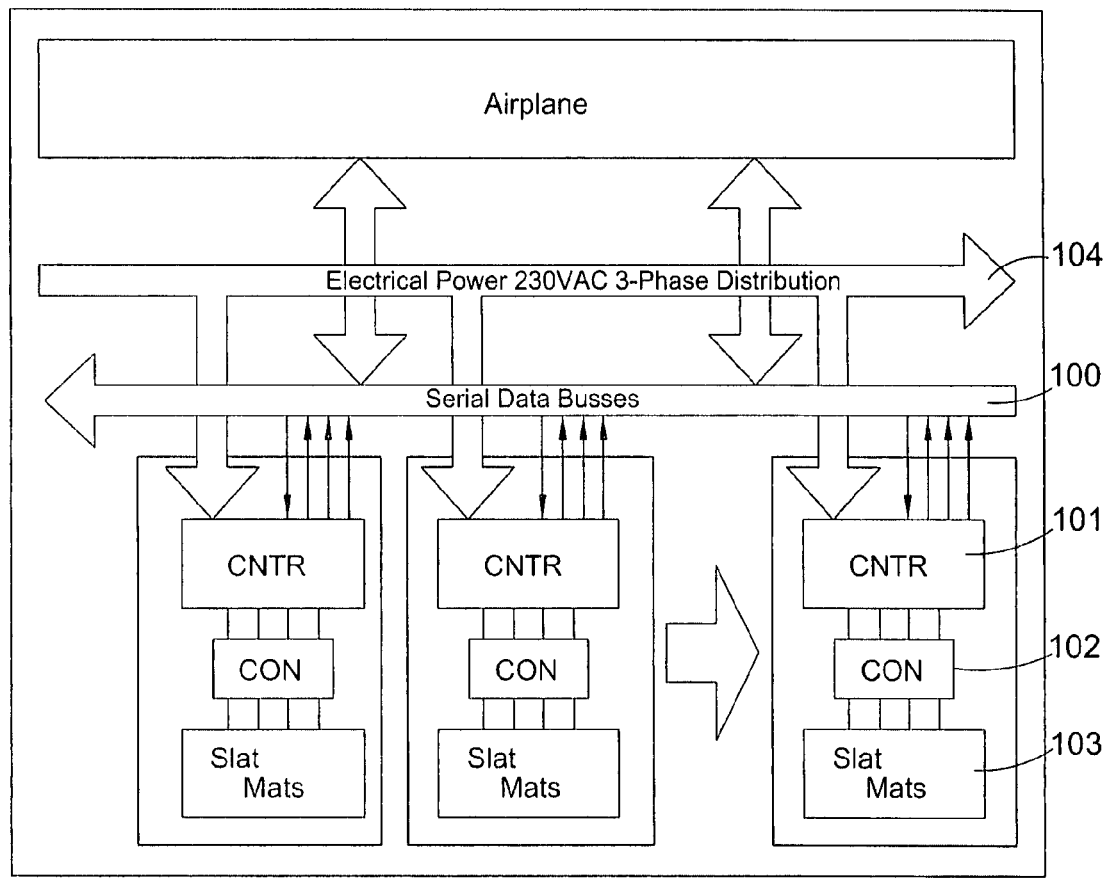
FIG. 16 is a schematic diagram of an ice protection system in which the aircraft wing coupling arrangement of the present invention can be employed.

FIG. 16 is a schematic diagram of a control system for providing wing ice protection. The control communications are provided from the aeroplane over serial buses 100 to the local controllers 101 provided in the aircraft wing coupling arrangement. The aircraft wing coupling arrangements 102 then electrically couple the controllers with the slat heater mats 103. The controllers 101 control the application of the electric power from the 3-phase distribution 104.

Although the present invention has been described with reference to a specific embodiment in the form of an ice protection system, it will be apparent to a skilled person in the art that modifications lie within the spirit and scope of the present invention.

For example, the present invention is not limited to an ice protection system. Further, the form of the cable assembly is not limited to the cable assembly of the described embodiments. For example, the cable assembly can be formed of a cable chain as are known in the art to provide for only planar flexing of the cable. The cable chain can also restrict motion in the plane to only one direction. As an alternative, any flat ribbon cable can be used. Further, the cable assembly is not limited to the provision of electrical cable connections and the cable assembly can carry any required service conduit.

Although in the embodiment the cable support member 13 only supports the cable assembly at the U bend region when the cable is stowed, in one alternative embodiment, the cable support can resiliently urge the cable at all times, i.e. even when the telescopic assembly is extended.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. An aircraft wing coupling arrangement for coupling services with a wing component which is translationally extendible from the wing of an aircraft, the arrangement comprising:

a housing for mounting in said wing and including a first coupling member;

a hollow telescopic assembly extending from said housing for connection at a distal end to said wing component and having a second coupling member at said distal end, said hollow telescopic assembly being extendible between a retracted and an extended position; and a service carrying conduit arrangement for carrying said services to and/or from said wing component, said service carrying conduit arrangement extending through said hollow telescopic assembly from said second coupling member to said first coupling member, and being flexible, wherein said housing is adapted to locate excess said service carrying conduit arrangement in a flexed configuration when said hollow telescopic assembly is in said retracted position, and said hollow telescopic assembly contains said service carrying conduit arrangement only in a non-flexed configuration.

2. An aircraft wing coupling arrangement according to claim 1, wherein said hollow telescopic assembly is adapted to retract along an axis different than a longitudinal axis of said housing.

3. An aircraft wing coupling arrangement according to claim 1, wherein said housing extends substantially perpendicularly to said hollow telescopic assembly.

4. An aircraft wing coupling arrangement according to claim 1, wherein said service carrying conduit arrangement is adapted to flex in only a plane to translationally locate excess thereof in said housing when said hollow telescopic assembly is in said retracted position.

5. An aircraft wing coupling arrangement according to claim 4, wherein said service carrying conduit arrangement is adapted to be connected to said first coupling member to form a U shaped region which moves along said housing when said hollow telescopic assembly is moved between said extended and retracted positions.

6. An aircraft wing coupling arrangement according to claim 4, wherein said housing extends substantially perpendicularly to said hollow telescopic assembly in said plane, said hollow telescopic assembly is connected to said housing at one end of said housing, and said service carrying conduit arrangement is adapted to be connected to said first coupling member to form a U shaped region which moves along said housing when said hollow telescopic assembly is moved between said extended and retracted positions.

7. An aircraft wing coupling arrangement according to claim 4, wherein said service carrying conduit arrangement is adapted to flex only in one direction in said plane.

8. An aircraft wing coupling arrangement according to claim 7, wherein said service carrying conduit arrangement is adapted to flex only in one direction in said plane, to flex through a right angle in said housing where said hollow telescopic assembly is attached to said housing, and to lie against inner walls of said housing, the arrangement including support members at said right angle and said U shaped region in said housing to maintain said service carrying conduit arrangement against said inner walls at least when said hollow telescopic assembly is in said retracted position.

9. An aircraft wing coupling arrangement according to claim 8, including material having a low frictional coefficient applied to said inner walls.

10. An aircraft wing coupling arrangement according to claim 8, including resilient material arranged in said housing between said housing and said service carrying conduit arrangement to dampen movement of said service carrying conduit arrangement in a direction out of said plane.

11. An aircraft wing coupling arrangement according to claim 10, wherein said resilient material is arranged in two layers parallel to said plane and either side of said service carrying conduit arrangement.

12. An aircraft wing coupling arrangement according to claim 11, including material having a low frictional coefficient applied to said layers.

13. An aircraft wing coupling arrangement according to claim 1, including guides arranged in said hollow telescopic assembly through which said service carrying conduit arrangement extends and is guided.

14. An aircraft wing coupling arrangement according to claim 1, including a wing component coupling arrangement for coupling said distal end of said hollow telescopic assembly to said wing component, said wing component coupling arrangement including a wing component coupling member for coupling with said second coupling member.

15. An aircraft wing coupling arrangement according to claim 14, wherein said wing component coupling arrangement is adapted to break at a predetermined load, extension of said hollow telescopic assembly, or rotation of said hollow telescopic assembly to separate said hollow telescopic arrangement and said wing component.

16. An aircraft wing coupling arrangement according to claim 14, wherein said wing component coupling arrangement is adapted to allow said hollow telescopic assembly to be detached from said wing component for fitting and/or maintenance.

17. An aircraft wing coupling arrangement according to claim 1, wherein said housing includes a pivot arrangement to provide for the pivotal mounting of said aircraft wing coupling arrangement on said wing.

18. An aircraft wing coupling arrangement according to claim 1, including a local controller coupled to or provided in said housing for providing local control of the services to and/or from said wing component.

19. An aircraft wing coupling arrangement according to claim 1, wherein said hollow telescopic assembly comprises a plurality of coupled concentric tubes, each concentric tube which is coupled to another concentric tube has a bearing housing member housing a bearing arrangement to allow two said coupled concentric tubes to move relatively translationally, said bearing housing members define a radial gap between said two coupled concentric tubes, at least one radial hole is provided in an outer said concentric tube and/or said bearing housing member for communicating ambient conditions to said gap, and said bearing housing member of a radially inner of said two coupled concentric tubes has a shoulder shaped to close said gap when said hollow telescopic assembly is in the extended position.

20. An aircraft wing coupling arrangement according to claim 1, wherein said service carrying conduit arrangement comprises a plurality of electrical power cables.

21. An aircraft wing coupling arrangement according to claim 20, wherein said service carrying conduit arrangement includes electrical signal cables.

22. An aircraft wing coupling arrangement according to claim 20, wherein said wing component comprises a slat, said aircraft wing coupling arrangement is for coupling electrical power and signals to an electrical ice protection arrangement provided on said slat, and said service carrying conduit arrangement comprises electrical cables for carrying heater power for at least one heating element of said ice protection arrangement on said slat and feedback signals from at least one detector element of said ice protection arrangement.

* * * * *